(12) United States Patent
Nouwens et al.

(10) Patent No.: US 8,992,152 B2
(45) Date of Patent: Mar. 31, 2015

(54) TUBULAR HANDLING SYSTEM AND METHOD FOR HANDLING TUBULARS

(75) Inventors: Ronny Lambertus Waltherus Nouwens, Schiedam (NL); Terence Willem August Vehmeijer, The Hague (NL); Joop Roodenburg, Delft (NL)

(73) Assignee: Itrec B.V., Schiedam (NL)

( * ) Notice: Subject to any disclaimer, the term of this patent is extended or adjusted under 35 U.S.C. 154(b) by 0 days.

(21) Appl. No.: 13/388,892

(22) PCT Filed: Jul. 28, 2010

(86) PCT No.: PCT/NL2010/050486
§ 371 (c)(1),
(2), (4) Date: Apr. 13, 2012

(87) PCT Pub. No.: WO2011/016719
PCT Pub. Date: Feb. 10, 2011

(65) Prior Publication Data
US 2012/0195716 A1    Aug. 2, 2012

Related U.S. Application Data

(60) Provisional application No. 61/231,413, filed on Aug. 5, 2009.

(51) Int. Cl.
*E21B 19/00* (2006.01)
*F16L 1/19* (2006.01)
(Continued)

(52) U.S. Cl.
CPC ............... *F16L 1/19* (2013.01); *E21B 19/155* (2013.01); *F16L 1/203* (2013.01); *F16L 1/207* (2013.01)
USPC .................. 414/22.55; 414/746.1; 414/746.3

(58) Field of Classification Search
CPC ............ E21B 19/155; F16L 1/00; F16L 1/12; F16L 1/15; F16L 1/23
USPC .................. 414/22.51–22.71, 910, 911, 414/745.1–746.8
See application file for complete search history.

(56) References Cited

U.S. PATENT DOCUMENTS 4,274,778 A * 6/1981 Putnam et al. ............. 414/22.71
4,822,230 A * 4/1989 Slettedal .................... 414/22.54
(Continued)

FOREIGN PATENT DOCUMENTS

DE    10 2004 004 315    *   8/2005   ............. E21B 19/06
WO    WO 2007/108673 A1       9/2007

*Primary Examiner* — Saul Rodriguez
*Assistant Examiner* — Lynn Schwenning
(74) *Attorney, Agent, or Firm* — Birch, Stewart, Kolasch & Birch, LLP

(57) ABSTRACT

The present invention relates to a tubular handling system (1) comprising:—a tower (10) comprising a tubular lift device for lowering and/or raising a tubular in an essentially vertical orientation,—a support (20) for supporting the tubular-laying tower—a tubulars supply system, preferably provided on the support, for supplying tubulars to an essentially horizontal supply position in the vicinity of the tower,—a tubular handling apparatus (2) for transporting a tubular between the essentially horizontal supply position and the tubular lift device in the tower, wherein the tubular handling apparatus comprises: a gripper (4a, 4b) adapted for gripping the tubular, a base (6), and a boom (5) to which the one or more grippers are attached, which boom is pivotable with respect to the base in a boom. According to the invention, the tubular handling apparatus further comprises a vertical extending frame (7), wherein said base is guided by said frame and movable in a vertical translational movement with respect to the frame.

8 Claims, 13 Drawing Sheets

(51) Int. Cl.
 *E21B 19/15* (2006.01)
 *F16L 1/20* (2006.01)

(56) References Cited

U.S. PATENT DOCUMENTS

| | | | |
|---|---|---|---|
| 5,421,675 A * | 6/1995 | Brown et al. | 405/170 |
| 5,423,390 A * | 6/1995 | Donnally et al. | 175/85 |
| 6,220,807 B1 * | 4/2001 | Sorokan | 414/22.62 |
| 6,425,709 B1 * | 7/2002 | Frijns | 405/170 |
| 6,821,071 B2 * | 11/2004 | Woolslayer et al. | 414/22.63 |
| 6,854,520 B1 * | 2/2005 | Robichaux | 166/380 |
| 7,246,983 B2 * | 7/2007 | Zahn et al. | 414/22.65 |
| 7,581,904 B2 * | 9/2009 | Bursaux et al. | 405/166 |
| 7,802,636 B2 * | 9/2010 | Childers et al. | 175/52 |
| 2002/0159839 A1 | 10/2002 | Frijns et al. | |

* cited by examiner

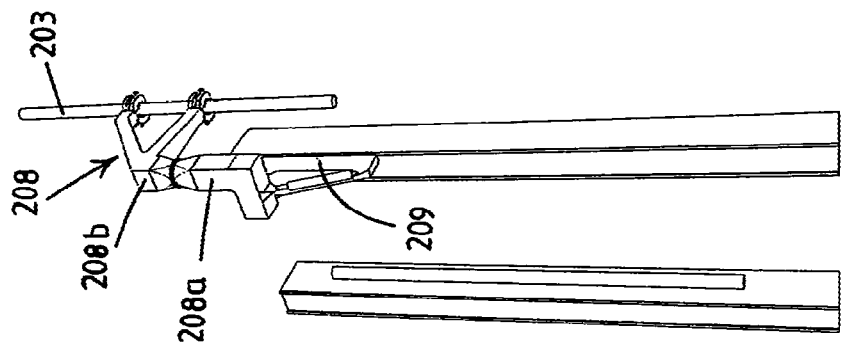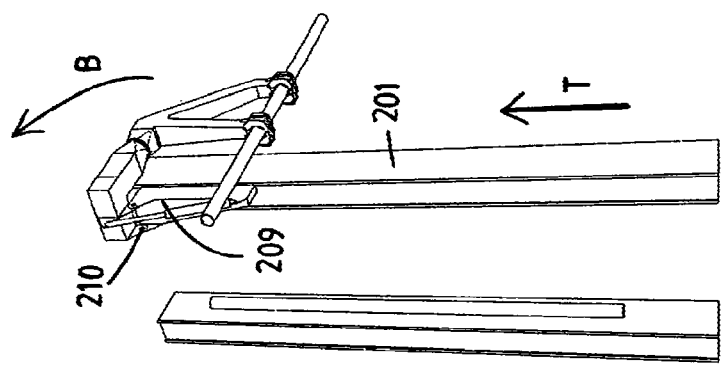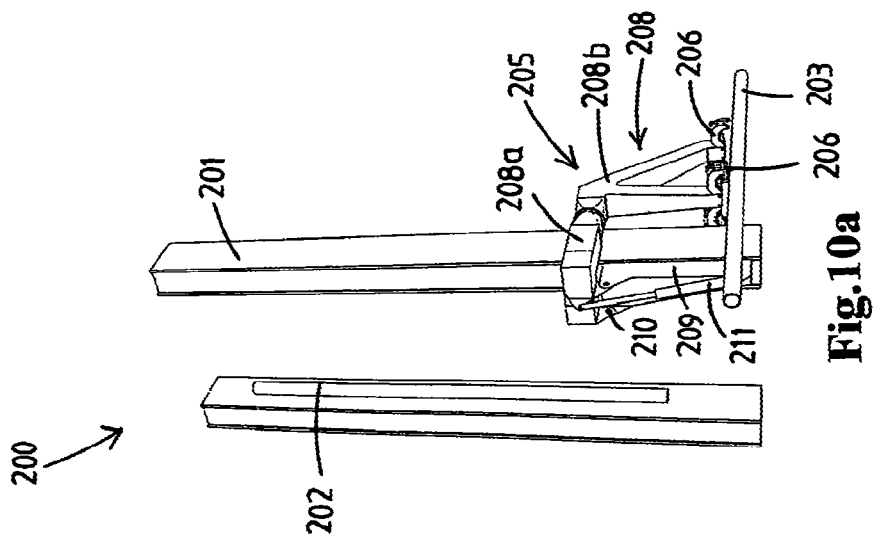

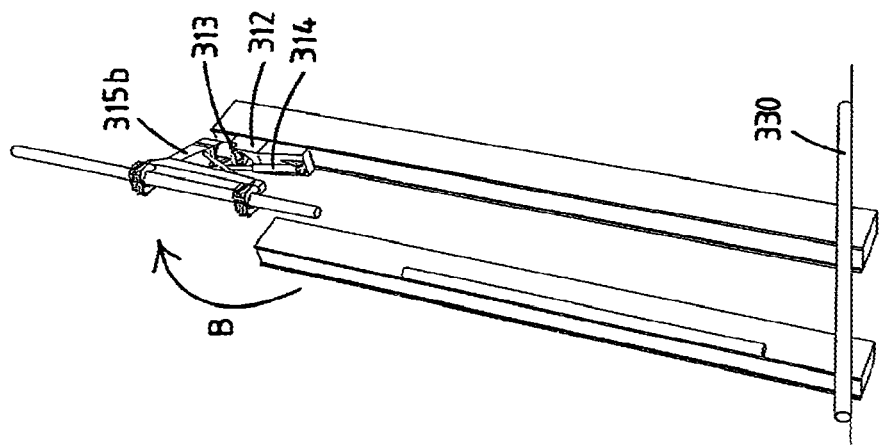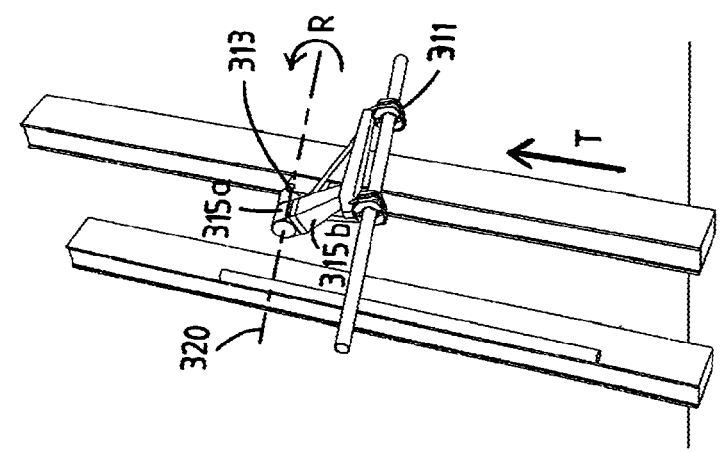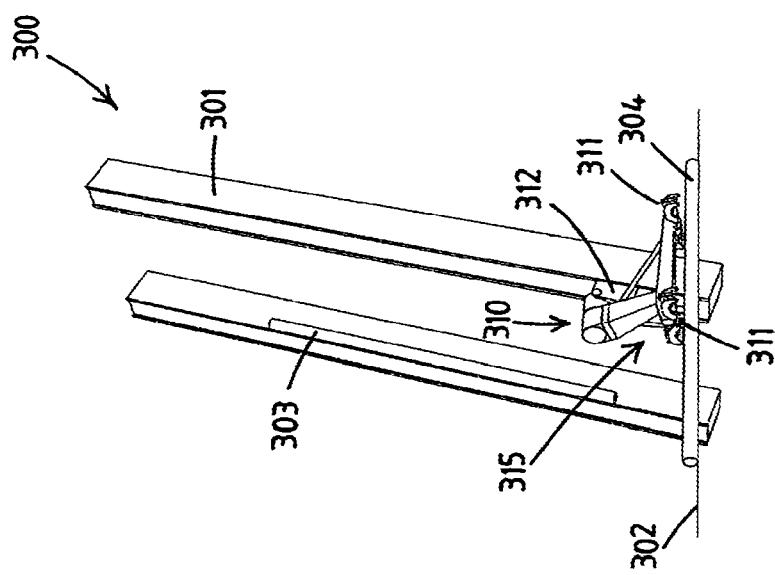

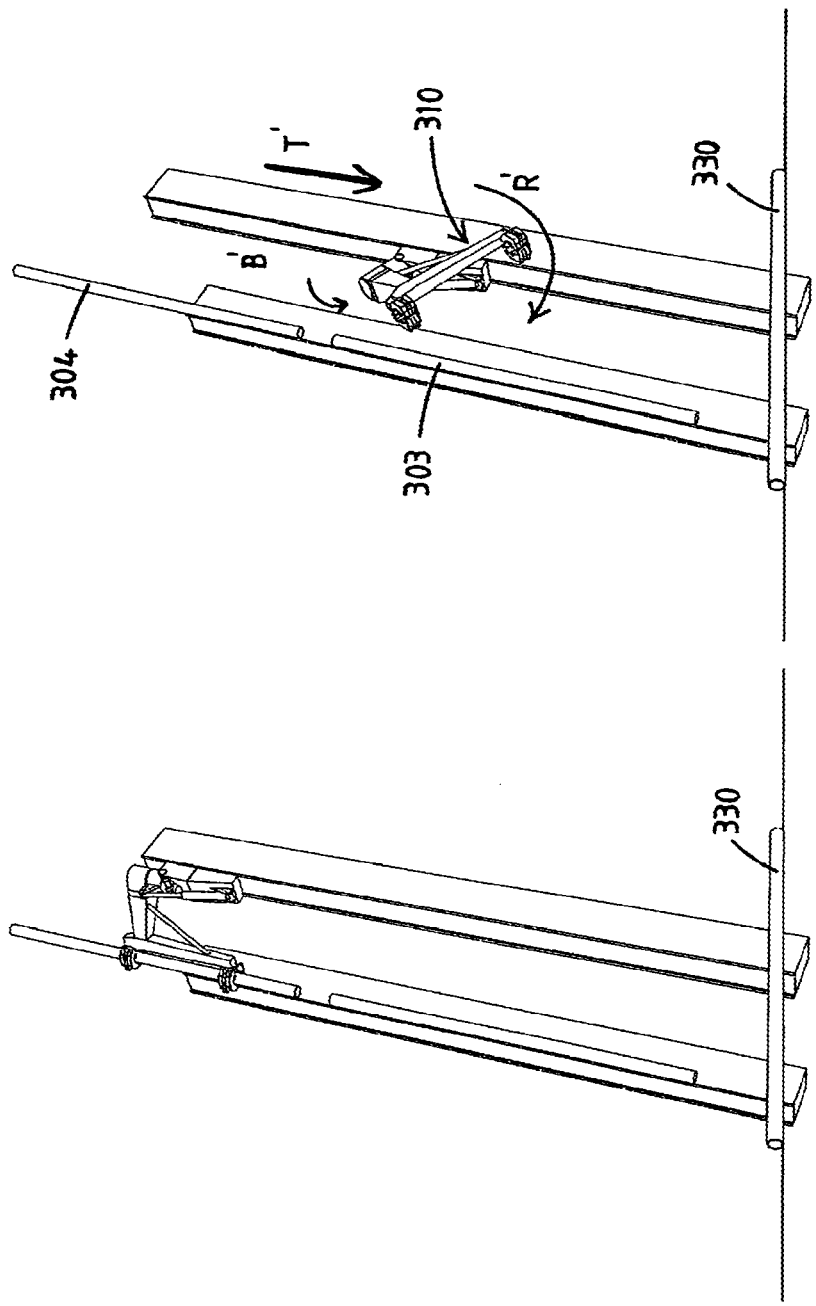

TUBULAR HANDLING SYSTEM AND METHOD FOR HANDLING TUBULARS

CROSS REFERENCE TO RELATED APPLICATIONS

This application is the National Phase of PCT/NL2010/050486 filed on Jul. 28, 2010, which claims priority under 35 U.S.C. 119(e) to U.S. Provisional Application No. 61/231,413 filed on Aug. 5, 2009, all of which are hereby expressly incorporated by reference into the present application.

The present invention relates to a tubular handling system comprising:
- a tower comprising a tubular lift device for lowering and/or raising a tubular in an essentially vertical orientation,
- a support for supporting the tubular-laying tower
- a tubulars supply system, preferably provided on the support, for supplying tubulars to an essentially horizontal supply position in the vicinity of the tower,
- a tubular handling apparatus for transporting a tubular between the essentially horizontal supply position and the tubular lift device in the tower, wherein the tubular handling apparatus comprises:
  - a gripper adapted for gripping the tubular,
  - a base,
  - a boom to which the one or more grippers are attached, which boom is pivotable with respect to the base in a boom pivot direction around a horizontal boom pivot axis, between a lowered position for gripping a tubular in the essentially horizontal supply position, and a raised position for delivering a tubular to the tubular lift device in the tower and vice versa.

The present invention further relates to a method for handling tubulars between an essentially horizontal supply position and a tubular lifting device for lowering and/or raising a tubular in an essentially vertical orientation, wherein use is made of a such a tubular handling system.

Such a tubular handling system and method are generally known and applied in the art. A disadvantage of the known system and method is that the taller the tubular-laying tower, the larger the dimension of the boom needs to be. This may result in extreme elongated booms, such as shown in EP2005050 of the same applicant. An alternative to such an extreme elongated boom is provided in the Saipem 7000 vessel, in which the tubulars are positioned upright on deck, after which they are transferred to the firing line by a dedicated trolley.

The object of the present invention is to provide an alternative tubular handling system and method. This is achieved according to a first aspect of the invention by providing the tubular handling apparatus with a vertical extending frame, wherein the base is guided by said frame and movable in a vertical translational movement with respect to the frame. As a result, the method for handling tubulars according to the invention is characterized by moving the base in a vertical translational movement with respect to the vertical extending frame.

The effect of the vertical extending frame is that the base is movable in a vertical translational movement, as a result of which the raised position of the boom is movable between a lower and more elevated position. Thus, a tubular held by the gripper which is attached by the boom is movable to a more elevated position. This is in particular advantageous when a tubular is to be positioned at an elevated position. This is e.g. the case when voluminous accessories, such as PLET's, have to be transported to and positioned in the tower, below the tubular. The tubular may be connected on top of the accessory. Alternatively, this is advantageous when the tubular is to be provided above one or more tensioners provided in the tower.

In a preferred embodiment, the tower further comprises an accessory lifting device for lowering and/or raising an accessory, in particular a voluminous accessory such as a PLET. The tubular handling system may in addition be provided with an accessories supply system, preferably on the support, for supplying an accessory to the accessory lifting device of the tower. Above the location where the accessory is positioned in the tower, a welding device may be provided for welding a tubular on top of the accessory. A tubular lifting device is preferably embodied such that a tubular may be lowered on top of the accessory, in the welding station. In such an embodiment, it is not necessary to provide the welding station with doors.

Hence, the tubular handling apparatus according to the invention is in fact a combined tubular loader and a tubular elevator, resulting in a very compact tubular handling apparatus and tubular handling system. In addition, as a result of the combination, the method for handling tubulars can be much more efficient. Another advantage of the apparatus according to the invention is that the safety is increased, as the apparatus requires fewer handovers than when separate apparatuses are used.

The tubular handling system according to the invention tower may e.g. be a drilling rig structure or a pipelay tower. The pipelay tower is preferably suitable for J-lay pipelaying operations. The tower is provided with a tubular lift device for lowering and/or raising a tubular in an essentially vertical orientation. Such a lift device may for example be a hoisting device comprising a winch and hoist cable. Alternatively, in J-lay towers a hang off clamp may be provided for controlled lowering and raising tubulars.

The tubular to be raised and/or lowered may be a single tubular or multiple connected tubulars, such as a string of interconnected tubulars. In J-lay pipelaying operations, the tubular is a pipe section. It is quite common to handle double, triple or even quadruple length pipe sections, i.e. two, three or four normal 40 foot (12 meters) lengths of pipe welded together (e.g. on the vessel, or earlier).

An advantage of the tubular handling system and method according to the invention is that the system is compact, and occupies only a small volume of support surface. This is in particular advantageous when the tubular handling system is to be provided on a vessel, wherein the support for supporting the tower, and possibly also the tubulars supply system, is formed by the deck of the vessel. The vessel may be of a monohull design, but other design (e.g. as a semi-submersible vessel, as converted drilling rig, etc) are also possible. Alternatively, the tower is supported by a platform, a quay or the mainland.

The system according to the invention is provided with a tubulars supply system for supplying tubulars to an essentially horizontal supply position in the vicinity of the tower. Such a system may for example transport tubulars from a tubular storage, in which the tubulars may be stored in a horizontal or vertical orientation. The supply system may e.g. include a lift, a rotation device for rotating the tubulars, a trolley for transporting the tubular and possibly also a rail or set of rails for the trolley. The tubulars supply system is preferably provided on the support for supporting the tower, but alternative locations, such as a tubular supply vessel are also conceivable.

In general, a tubular handling system is provided with a tubular handling apparatus for transporting a tubular between the essentially horizontal supply position and the tubular lift device in the tower. Known tubular handling apparatuses comprise a gripper adapted for gripping the tubular, a base and a boom.

One or more grippers may be provided, which are attached to the boom. In a preferred embodiment, the gripper is rotatably attached to the boom about a gripper rotation axis. As such, a further rotation of the tubular held by the grippers is made possible. In an alternative embodiment, a gripper assembly may be provided, including a rotatable gripper arm structure which can pivot about a pivot axis parallel to the boom structure, e.g. by suitable hydraulic actuator. At the end of the gripper arm structure multiple pipe grippers are preferably arranged which can grip the tubular.

The boom is pivotable with respect to the base in a boom pivot direction around a horizontal boom pivot axis, between a lowered position for gripping a tubular in the essentially horizontal supply position, and a raised position for delivering a tubular to the tubular lift device in the tower and vice versa. Preferably, a boom rotation device is provided for rotating the boom, which may for example comprise one or more hydraulically actuated cylinders.

The tubular handling apparatus according to the invention is provided with a vertical extending frame, wherein said base is guided by said frame and movable in a vertical translational movement with respect to the frame. The vertical extending frame may be a construction supported by the support, or, in an alternative embodiment, be part of the tower. The vertical extending frame may comprise one or more rails along which the base is moveable. Vertical movement may be enabled by a hydraulic, pneumatic or electric device.

In a preferred embodiment, the boom comprises a non-rotatable boom portion connected via the horizontal boom pivot axis to the base and a rotatable boom portion comprising the one or more grippers. The rotatable boom portion is rotatable with respect to the non-rotatable boom portion about a rotation axis of the boom, extending substantially parallel to the tower in the raised position of the boom. This embodiment allows more accurate positioning of the tubular held by the gripper. In a preferred embodiment, the boom is an elongated boom, and the rotation axis of the boom is parallel with the longitudinal axis of the elongated boom.

The object of the invention is achieved according to a second aspect of the invention by providing the boom with a non-rotatable boom portion connected via the horizontal boom pivot axis to the base and a rotatable boom portion comprising the one or more grippers, which rotatable boom portion is rotatable with respect to the non-rotatable boom portion about a rotation axis of the boom, extending substantially parallel to the tower in the raised position of the boom. Such a handling system is in particular beneficial for pipe laying systems.

The invention will now be disclosed in more detail referring to preferred embodiments shown in the drawing.

In the drawings:

FIGS. 10a-10e show in perspective view an alternative example of a tubular handling system according to the invention, in various positions in use;

FIGS. 11a-11e show in perspective view yet an alternative example of a tubular handling system according to the invention, in various positions in use.

Figure 1:
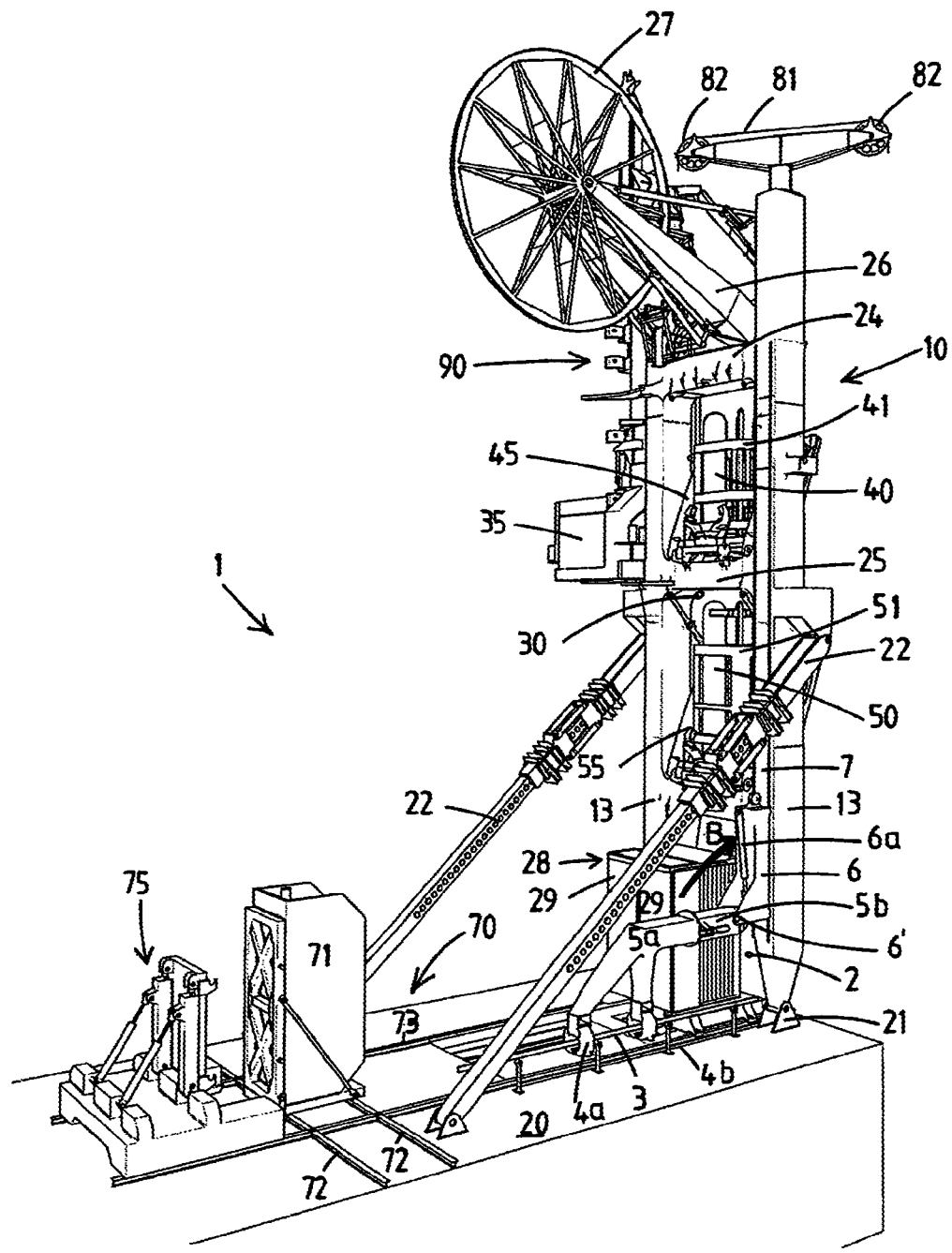
FIG. 1 shows in perspective view an example of a tubular handling system according to the invention, in use in a first position.

In FIG. 1 a tubular handling system 1 according to the invention is shown. The tubular handling system 1 comprises a support 20 for supporting a tower 10. The tower 10 is in this embodiment a pipeline launch tower 10, which will be described in more detail below. The tower 10 allows to launch pipeline (and other objects as will be explained) through a moonpool (not shown) or aside the support 20.

Here, the tower is positioned at an end side of the support 20, which may e.g. be the aft side of a vessel. In an alternative layout the tower 10 could e.g. be arranged at the port or starbord side of the vessel, or in a centre part of the vessel.

In another, not shown embodiment, the tower could have the form of a derrick (e.g. a latticed framework) extending over the moonpool, wherein the firing line or tubular launch trajectory-passes within the structure of the derrick.

The tower 10 is supported at its lower end on the support 20 by a pivot structure 21 having a horizontal pivot axis, here at right angles to the centreline of the support 20. The tubular handling apparatus according to the invention is suitable to transport tubulars from between an essentially horizontal supply position and the tubular lift device in the tower, even in a tilted position of the tower.

At least one, here two telescopic members 22 arranged between the support 20 and the tower 10 allow to adjust the inclination of the tower 10. In this example the inclination of the tower 10 can be varied in the range from 0 degrees to 20 degrees from vertical. When desired a smaller or broader range of tower inclination (or even a non-inclinable tower) can be envisaged. When performing J-Lay operation it is sometimes desired to arrange the tower 10 at an incline as is known from the art.

In this example the tower 10 comprises two spaced apart main vertical beams 13 interconnected by a number of horizontal crossbeams 24, 25.

In the shown embodiment, the apparatus according to the invention is provided on a vessel also suitable for reel-lay. According to the invention, the apparatus is also suitable for vessels having a tower only suitable for J-laying pipes. In the shown embodiment, suitable for reel-lay of pipelines, at the upper end of the tower 10 a pipeline guide is arranged, here embodied as a circular pipeline guide member 27, over which the pipeline to be laid can be guided. Alternatively, a semicircular guide member having rollers may be provided. As such the guide member 27 diverts a pipeline coming from a reel to an imaginary tubular launch trajectory 30 here extending along the moonpool facing side of the tower 10. The trajectory 30 here is essentially parallel to the tower 10 and the remains so even when the tower 10 is inclined.

Pipeline guide member 27 is mounted retractably to the tower, via beams 26 which are pivotably connected to the tower 10. The pipeline guide member 27 is shown in the retracted position in FIG. 2.

In an embodiment of the tower as a derrick over said moonpool the trajectory would extend within said derrick.

The tower 10 is equipped in this example (as is preferred) with two pipeline tensioners, an upper tensioner 40 and a lower tensioner 50. This arrangement of two tensioners 40, 50 allows for a large number of operations to be performed (more than with a single tensioner), whereas a larger number of tensioners (although possible with the present invention) is considered to increase the complexity of the system in undesirable manner.

Tensioners are well known in the art of marine pipelaying. Commonly such tensioners include a tensioner frame and multiple, e.g. four endless tracks supported in a mobile manner in the frame to allow for variation of the gap between the tensioner to at least accommodate various pipeline diameters.

Tensioners 40 and 50 are of a similar design here. In the example shown here each tensioner includes a tensioner frame 41, 51. The frame of each tensioner 40, 50 is supported by the tower 10 via an associated support assembly. In this preferred embodiment the tensioners 40, 50 are each supported by a parallel bar linkage composed here of two sets of parallel support bars 45, 55, each set at one side of the frame. As is common the bars 45, 55 are pivoted at both their ends to the tower 10 and the frame respectively. A bar 55 is clearly visible in FIG. 2.

Figure 2:
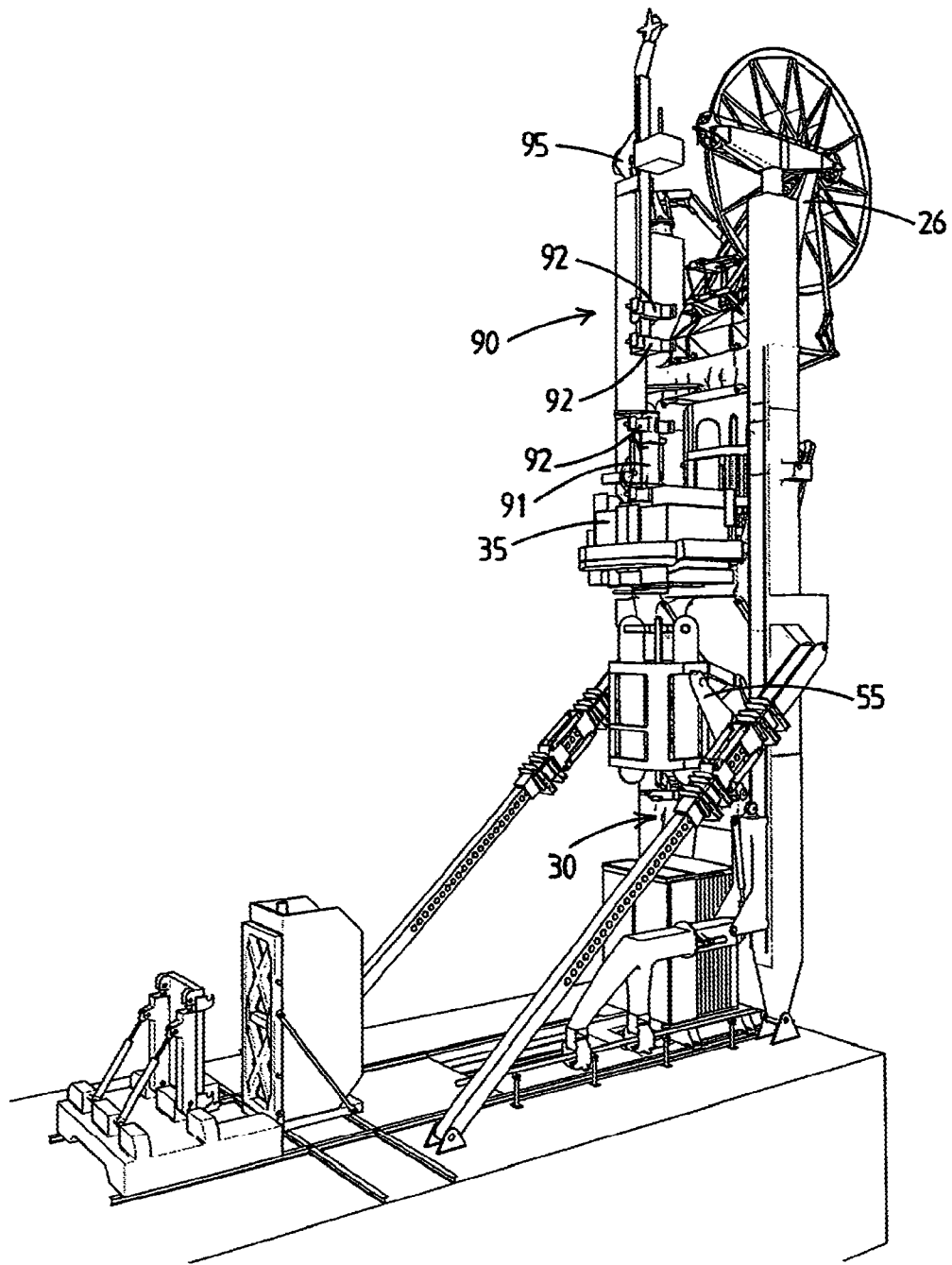
FIG. 2 shows the system of FIG. 1, in use in a second position.

As can be easily seen from both FIGS. 1 and 2 each tensioner frame (and the track units arranged therein) can be displaced between an active position (FIG. 2), wherein the pipeline launch trajectory 30 extends through the tensioner frame between the tracks, so that the tracks can engage on a tubular, and a retracted and non-operable position (FIG. 1), wherein the pipeline launch trajectory 30 extends outside the frame of the tensioner.

In the retracted position in this example each of the tensioners 40, 50 is received between the opening in the tower 10 formed by the vertical beams and the horizontal beams above and below the retracted tensioner. This provides for a docking station of each tensioner in retracted position. The tower 10 preferably is provided with one or more platforms to gain access to the tensioners in their retracted and possibly active position by crew of the vessel.

The pipelaying system may further include in addition to the two tensioners in the tower 10 a stationary or static pipeline support device, arranged below the tensioners 40, 50 and adapted to support—on its own—the entire weight of the launched pipeline suspending towards the seabed. In the drawings, a work station 28 is positioned above the pipeline support device. The pipeline support device can be a stationary frictional clamp, having one or more clamping elements engaging on the pipeline, said clamping elements being stationary while supporting the pipeline and not being part of a track (as in a tensioner) so that the pipeline can not be moved using said stationary frictional clamp in the direction of the pipeline axis.

Work station 28, e.g. for coating the pipeline, e.g. in the area of a weld or other connection, is provided here below the lower tensioner 50. The station 28 could also be mounted (in a dismountable manner when desired) on the tower 10 at said location.

The system could be provided with non-destructive testing or NDT equipment at one or more of the mentioned stations or at a separate station.

It could be that the stationary pipeline support device does allow for displacement essentially in a plane at right angles to the supported pipeline, possibly while supporting the load of the pipeline. In this respect "stationary" essentially means "stationary in the direction of the pipeline".

Preferably, the support device is embodied as a stationary hang-off clamp which can engage on the pipeline, e.g. having one or more support element engaging below a collar on the pipeline, and support the pipeline in a stationary manner. These hang-off clamps commonly include multiple mobile clamp parts allowing the clamp to be opened for release and passage of the pipeline and closed for support of the pipeline.

Preferably said a stationary or static pipeline support device, arranged below the tensioners 40, 50 is not supported by the tower 10, but on the hull of the vessel, e.g. via a hatch over the moonpool or otherwise, e.g. a sliding static pipeline support device mounted on the hull of the vessel (preferably at level of the support 20). It is noted that the support device could be supported by the tower if desired.

In a preferred embodiment, the pipeline support device is integrated in a hatch assembly or supported thereby, and the one or more hatch panels are adapted to support the weight of the launched pipeline when held by the pipeline support device.

As is common for marine pipelaying vessels the system 1 includes an A&R system for abandonment and retrieval of pipeline, and for lowering accessories such as PLETs. The A&R system generally includes a main A&R winch for a main A&R wire 81. This wire 81 is guided over a number of sheaves including A&R sheaves 82, which may be arranged so that the A&R wire end is aligned with the trajectory 30 at the upper end of the tower 10. The A&R wire can thus extend along said pipeline launch trajectory 30 downwards.

Preferably, as is this embodiment, the sheave 82 is arranged significantly above, preferably at least 4 meters, the upper tensioner 40. It is an option to provide said sheave above the lower tensioner, beneath the upper tensioner. This would have the drawback of reduction of the height of accessories to be handled by the system when the A&R system is used therefor.

The tubular handling system 1 further includes an accessory supply system 70 adapted for bringing an accessory, here a PLET 71 as example, to a location aligned with the pipeline launch trajectory 30 and/or aligned with a launched tubular held by the pipeline support device, so that said accessory 71 may be connected to said (launched) pipeline.

The accessory supply system 70 includes a rail structure extending over the support 20. In this example the rail structure comprises a first stretch of rails 72 and a second stretch 73 at right angles thereto, which second stretch 73 extends "across" the moonpool, in this example, into work station 28. Work station 28 is provided with doors 29 to allow entry of the PLET 71. A PLET handling device 75 is also provided on the rails 73 to move the PLET from the storage position into the tower. Work station 28 may enable welding of tubulars on top of the PLET.

At the height of the upper tensioner 40 here the tower 10 also is provided with J-lay equipment 90 which is displaceable between an active and retracted position.

In the retracted position shown in FIG. 1 this J-Lay equipment 90 here is arranged on a lateral side of the tower 10.

In the active position shown in FIG. 2 the J-Lay equipment 90 is arranged so as to allow operation (s) with regard to pipeline arranged in the trajectory 30.

The J-Lay equipment 90 here includes an external pipe section alignment device 91, which may include one or more pipe clamps 92 as well as associated actuators for effecting alignment movements of these clamps in order to accurately align the lower end of the new tubular with the upper end of the tubular held by the lower tensioner 50. In a preferred embodiment, such a pipe section alignment device 91 may be referred to as a line-up tool.

In the shown embodiment, also an internal line up clamp (ILUC) 95 is provided, which is used during welding of the pipe sections.

In this example the equipment 90 further includes a pipe section work station, e.g. a welding station 35, provided above lower tensioner 50, at the same level as upper tensioner 40. When the upper tensioner 40 is retracted, as shown in FIGS. 1 and 2, the welding device 35 may be positioned in the firing line 30 above the lower tensioner 50. Welding station 35 preferably includes a welding chamber. Welding equipment can be arranged in said welding station to weld the pipeline ends together.

In the shown embodiment, the tensioners 40, 50, the pipeline support device such as a hang off clamp and/or the A&R system may be applied as a tubular lift device for lowering and/or raising a tubular in an essentially vertical orientation.

A tubulars supply system, preferably provided on the support, for supplying tubulars to an essentially horizontal supply position in the vicinity of the tower is not shown in the drawings.

Figure 5:
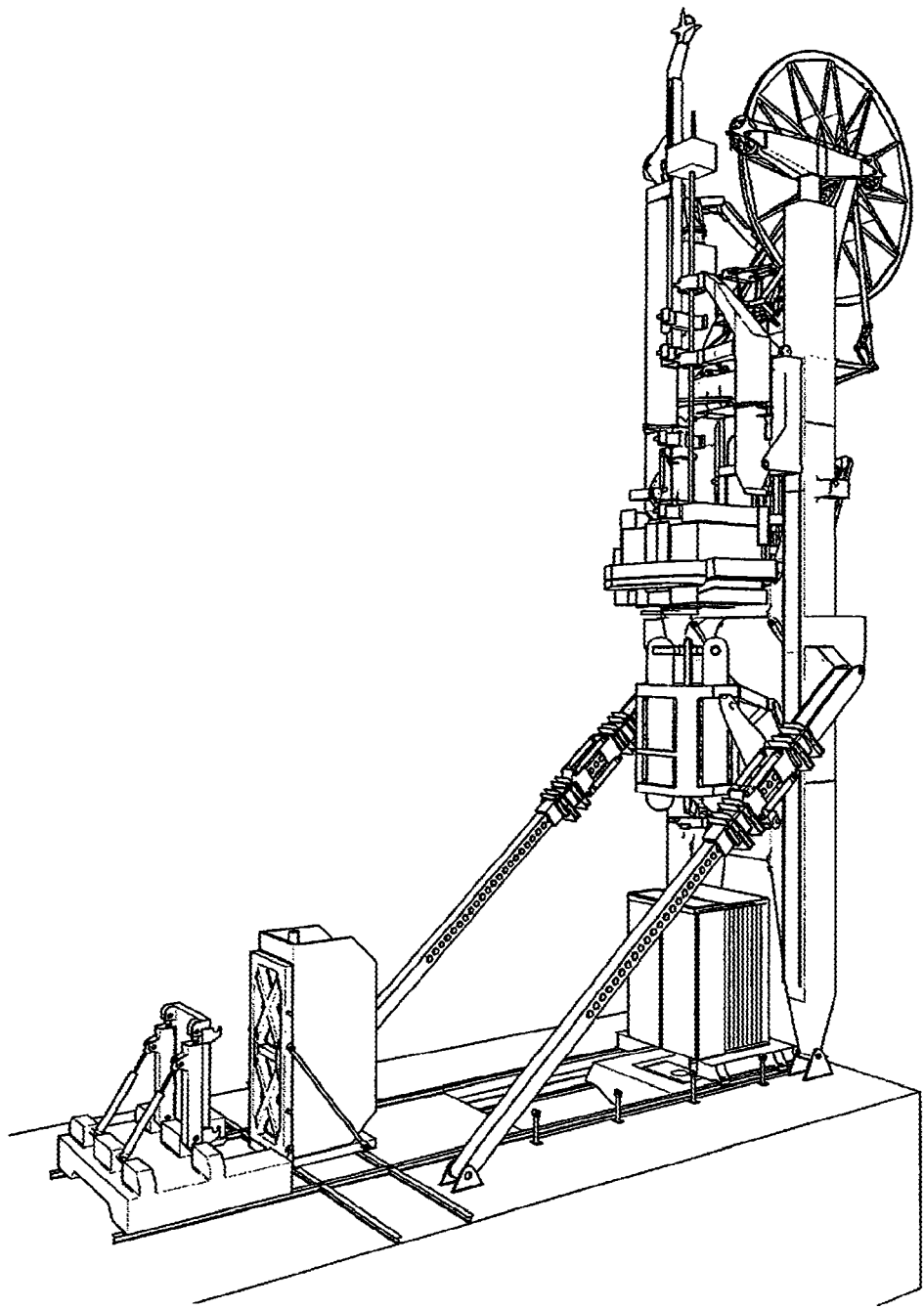
FIG. 5 shows the system of FIG. 1, in use in a fifth position.

The tubular handling system is provided with a tubular handling apparatus 2 for transporting a tubular 3 between the essentially horizontal supply position (shown in FIG. 1) and the tubular lift device in the tower (shown in FIG. 5).

Tubular handling apparatus 2 comprises two grippers 4a, 4b adapted for gripping the tubular 3. Grippers 4a, 4b are connected to a rotatable boom portion 5a. Rotatable boom portion 5a is rotatable with respect to non-rotatable boom portion 5b about a longitudinal rotational axis of the boom. This rotation is visible upon comparison of FIGS. 4 and 5.

Figure 4:
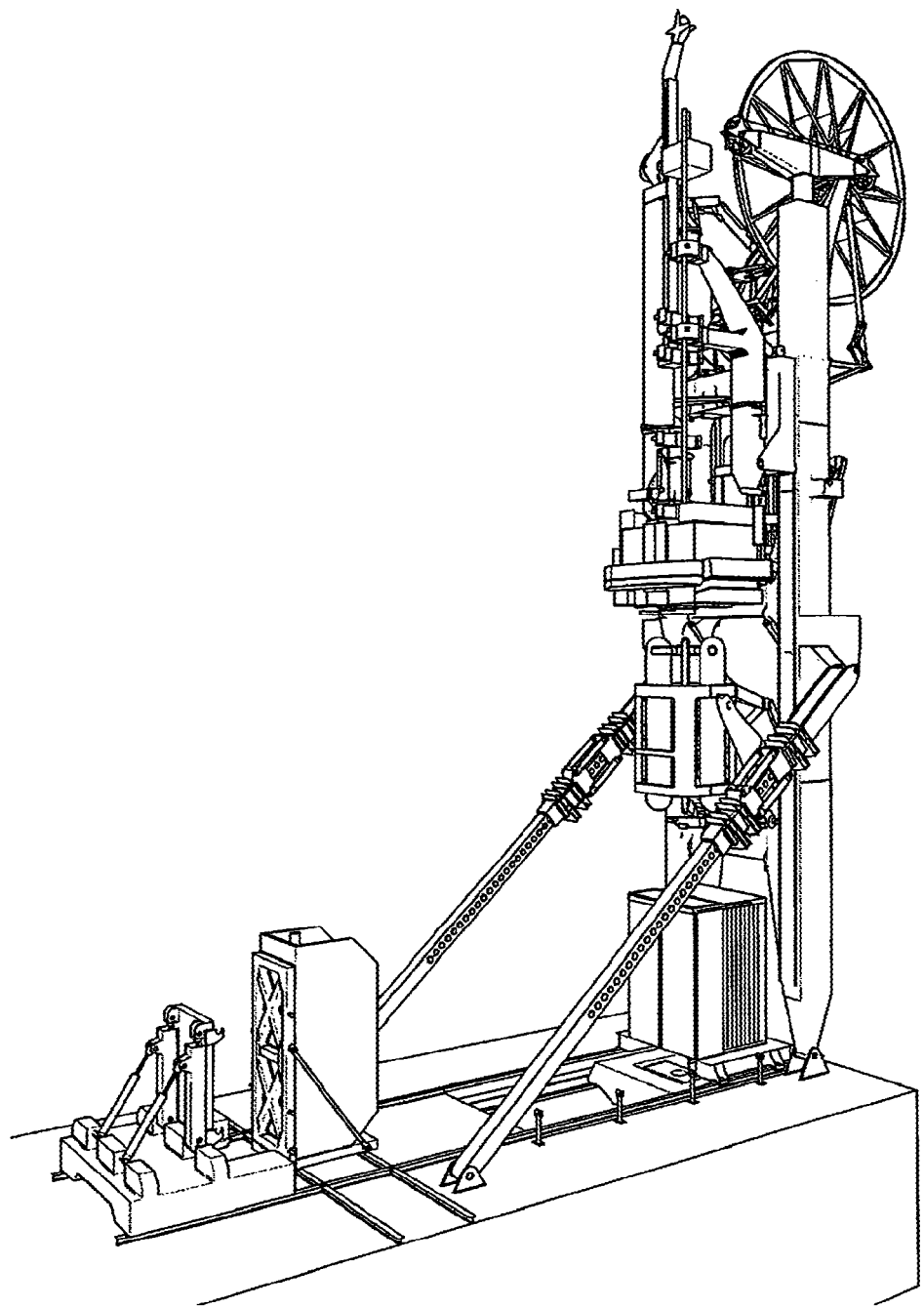
FIG. 4 shows the system of FIG. 1, in use in a fourth position.

Non-rotatable boom portion 5b is pivotably connected to base 6 via a horizontal boom rotation axis 6'. As a result, the boom 5 is pivotable with respect to the base 6 in a boom pivot direction B between a lowered position for gripping a tubular in the essentially horizontal supply position (as shown in FIG. 1), and a raised position for delivering a tubular to the tubular lift device in the tower (as shown in FIG. 4) and vice versa. The boom 5 shown in this embodiment is rotatable with respect to the base 6 with the aid of a hydraulically actuated cylinder 6a.

According to the invention, a vertical extending frame 7 is provided along the tower 10, wherein said base 6 is guided by said frame 7 and movable in a vertical translational movement with respect to the frame 7.

By following the procedure shown subsequently in FIGS. 1-5, a method for handling tubulars between an essentially horizontal supply position and a tubular lifting device for lowering and/or raising a tubular in an essentially vertical orientation is shown, wherein use is made of a tubular handling system according to the invention.

In FIG. 1, the gripping of a tubular 3 is shown by grippers 4a, 4b. Both tensioners 40, 50 are positioned in the retracted position. J-lay equipment 90 is shown in its inactive position. The tower 10 is in a vertical, non-tilted position. Pipeline guide member 27 is in an active position for laying flexible pipelines.

In FIG. 2, lower tensioner 50 is no longer retracted and positioned in firing line 30. Pipeline guide member 27 is retracted, and J-lay equipment 90, including work station 35 is moved into the active position.

Figure 3:
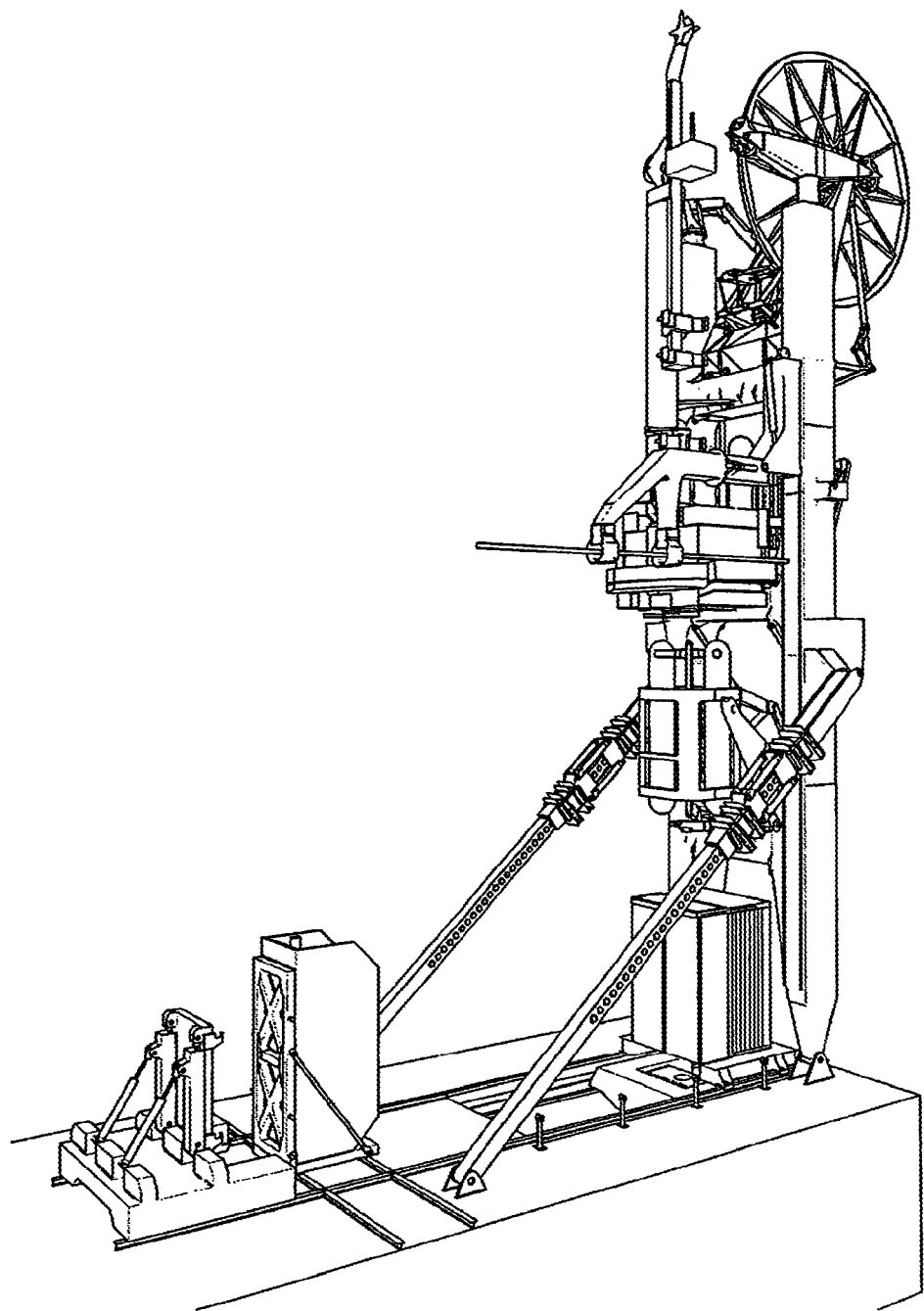
FIG. 3 shows the system of FIG. 1, in use in a third position.

In FIG. 3 base 6 of the tubular handling apparatus has moved in a vertical translational movement with respect to the vertical extending frame 7 and tower 10 to an elevated position, in this embodiment at the level of upper tensioner 40.

In FIG. 4 it is visible that boom 5 has rotated with respect to the base 6 from a lowered position in which the tubular 3 was in a horizontal position (shown in FIG. 3) to a raised position (shown in FIG. 4) in which the tubular 4 is in a vertical position.

Between FIGS. 4 and 5 the step of rotating the rotatable boom portion 5a with respect to the non-rotatable boom portion 5b is visible. By this rotation, tubular 3 is rotated into the line-up tool 91.

Figure 6:
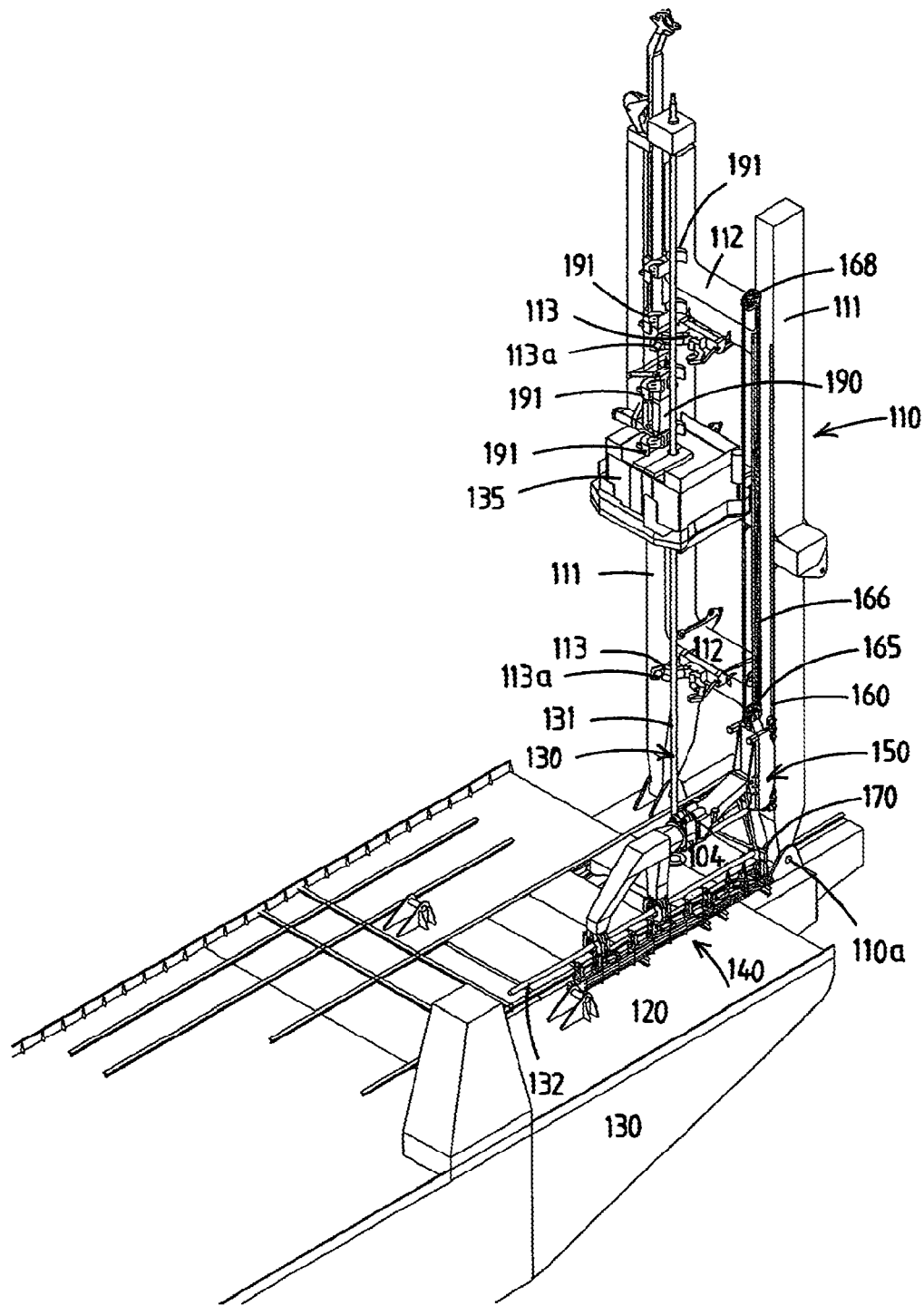
FIG. 6 shows an alternative embodiment of a tubular handling system according to the invention in a first position.
Figure 7:
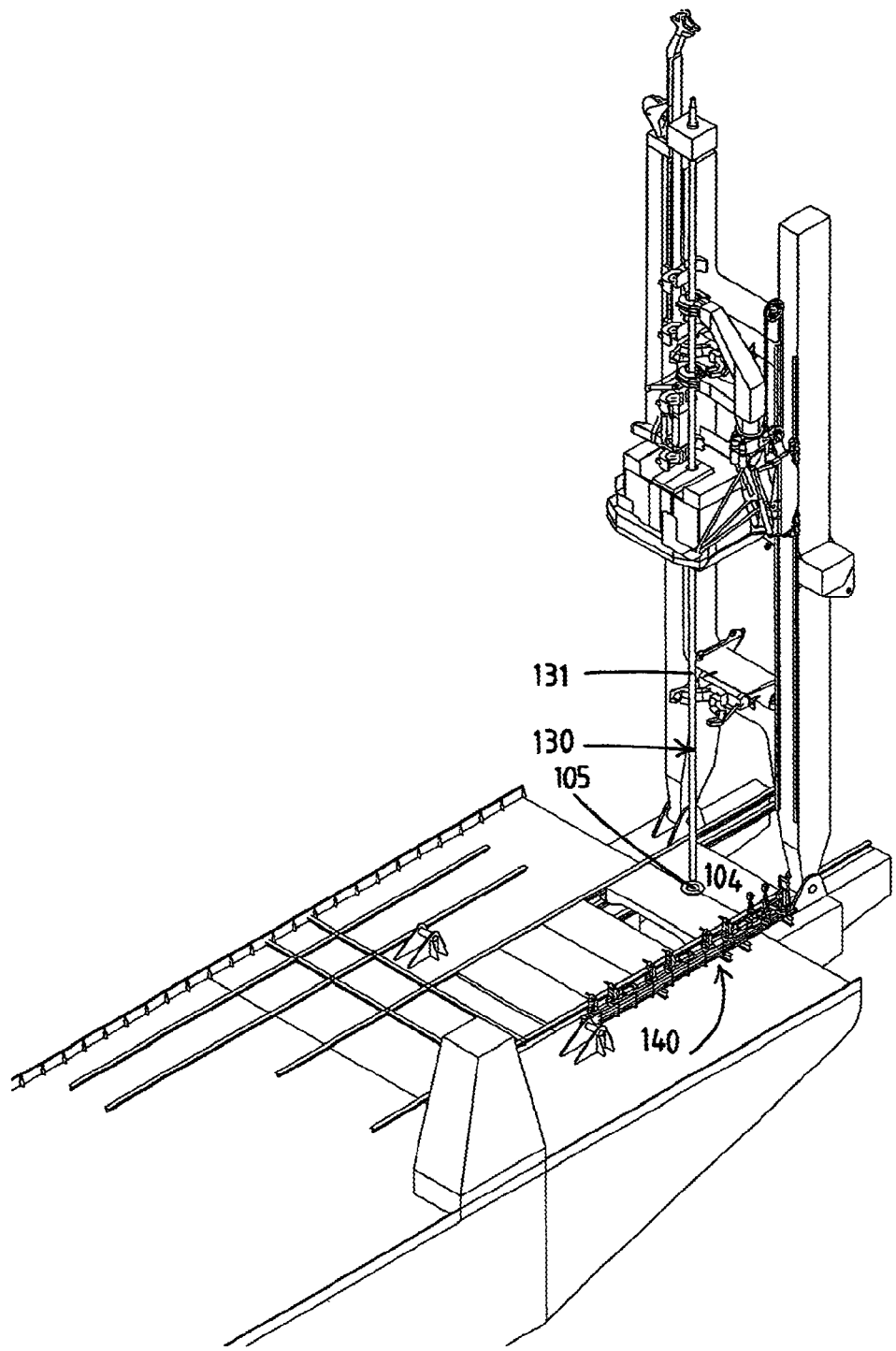
FIG. 7 shows the system of FIG. 6, in use in a second position.

In FIGS. 6 and 7 an alternative embodiment of a tubular handling system 100 according to the invention is shown. Tubular handling system 100 comprises a tower 110, supported on a deck 120 of a vessel 121. Tower 110 is pivotably supported by the deck 120 about pivot axes 110a. Tower 110 is provided at the stern side of the vessel 130.

Tower 110 comprises two elongated vertical beams 111, interconnected by horizontal beams 112. Horizontal beams 112 support tubular clamps 113, which may support or guide a tubular in the firing line 130 (in which in FIG. 6 a tubular 131 is provided). To guide the tubular, the clamps 113 are provided with rollers 113a.

Tower 110 is at the upper side provided with a line-up tool 190 comprising clamps 191 for accurate positioning a tubular positioned in the tower 110 in the firing line 130.

Tower 110 is provided with a work station 135 at an elevated position, below the line-up tool 190. A tubular positioned in the line-up tool 190 and aligned by the line up tool may be connected to the previously launched tubulars via welding in the work station 135.

The tower comprises a hang-off clamp for lowering a tubular in an essentially vertical orientation. The hang-off clamp may be integrated with, or positioned below, moonpool hatches 104 positioned above the moonpool 105 through which the firing line 130 extends.

The tubulars supply system 140 is only schematically indicated. Tubulars supply system is provided on the deck 120 and supplies tubulars 132 to an essentially horizontal supply position in the vicinity of the tower as is visible in FIG. 6.

Figure 8:
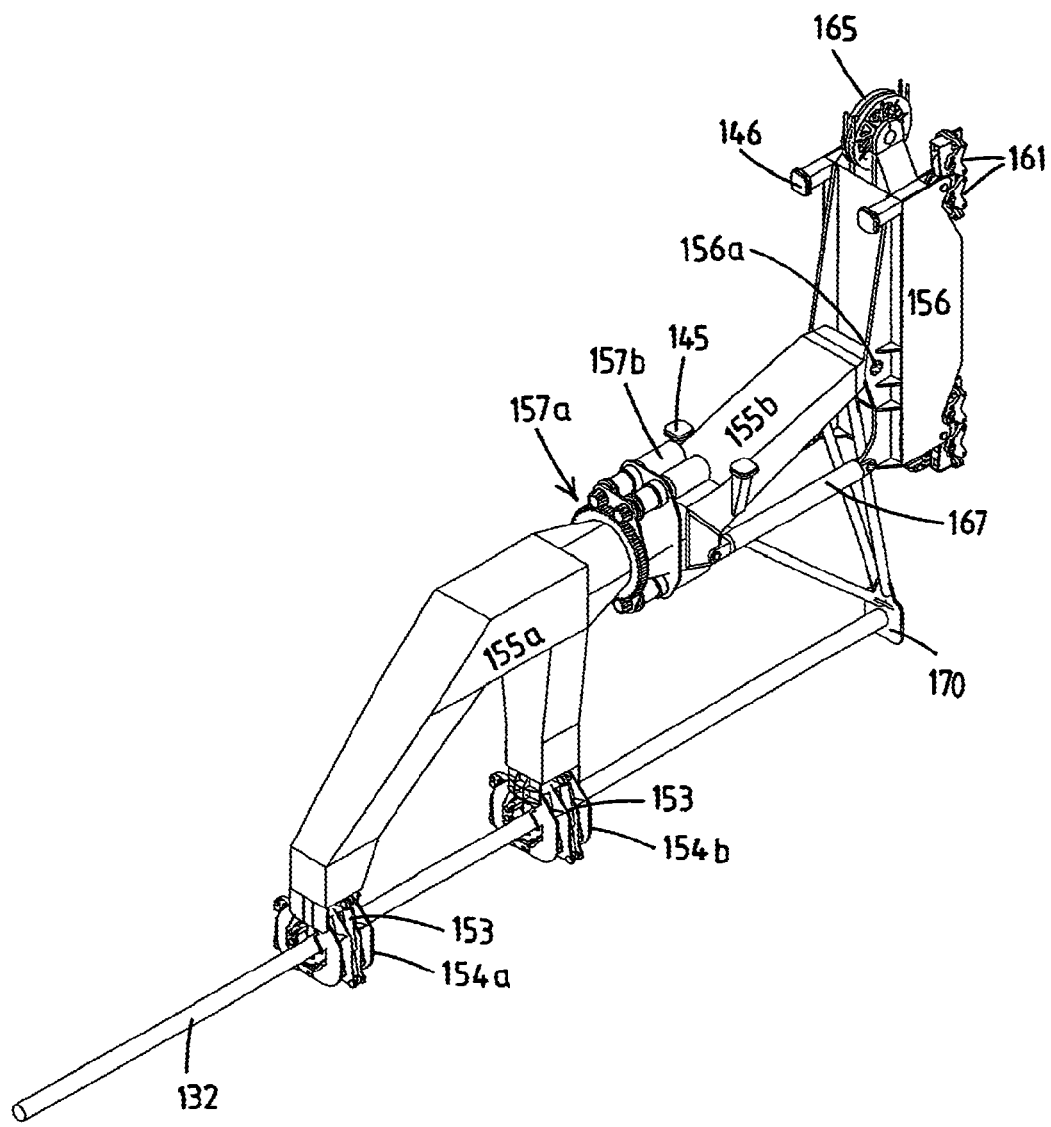
FIG. 8 shows a detail of the tubular handling apparatus of FIG. 6 in enlarged view in the first position.
Figure 9:
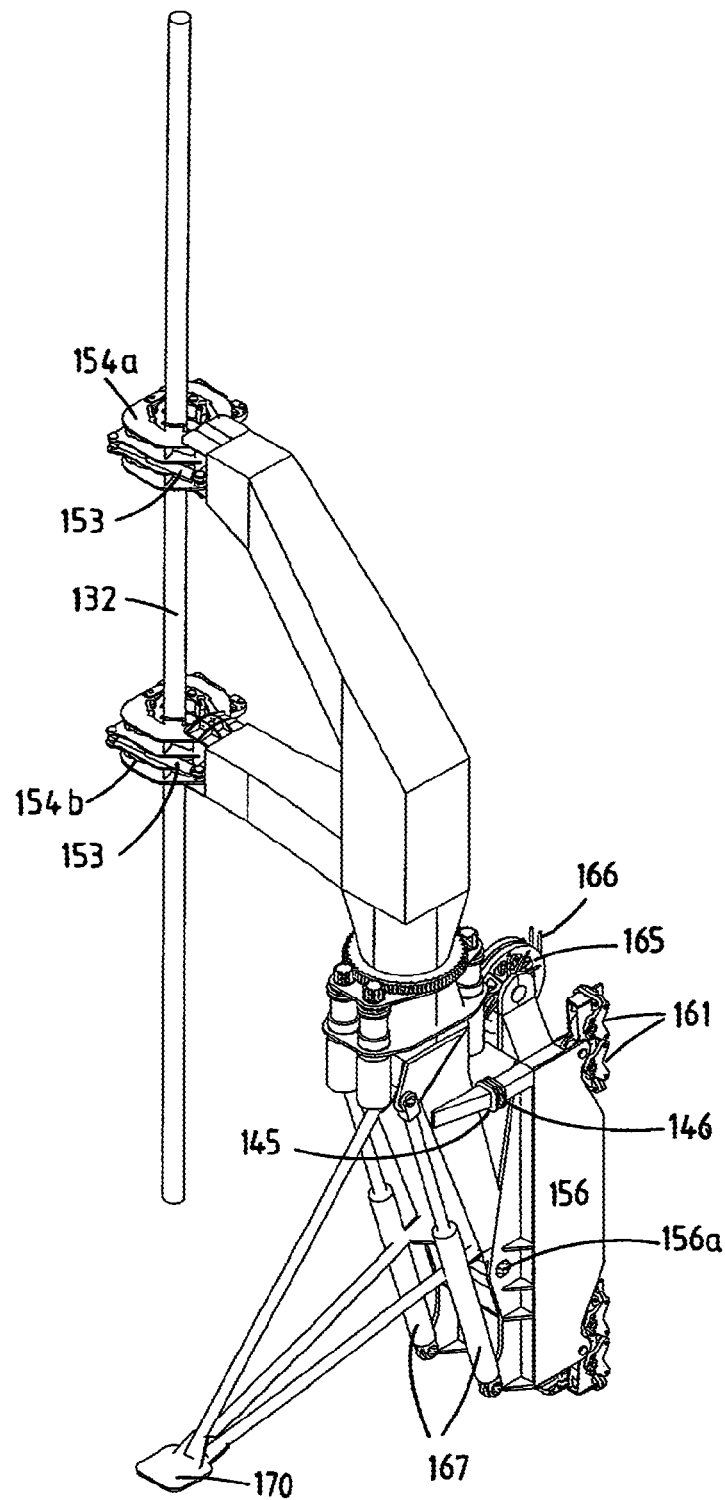
FIG. 9 shows a detail of the tubular handling apparatus of FIG. 6 in enlarged view in the second position.

A tubular handling apparatus 150 according to the present invention is shown in enlarged view in FIGS. 8 and 9. Tubular handling apparatus 150 is suitable for transporting a tubular 132 between the essentially horizontal supply position as is shown in FIG. 6 and the tubular lift device in the tower as is shown in FIG. 7.

Tubular handling apparatus 150 comprise two grippers 154a and 154b adapted for gripping the tubular. The grippers may be actuated by hydraulic actuators 153.

Grippers 154a, 154b are mounted to a boom 155, which boom 155 comprises a rotatable portion 155a and a non-rotatable portion 155b. The grippers are mounted to the rotatable portion 155a. Rotatable portion 155a is rotatable with respect to the non-rotatable boom portion 155b about a longitudinal rotation axis of the boom 155. The rotatable boom portion 155a is rotatable via a meshing gear and pinion assembly 157a, actuated by motors 157b. In FIGS. 7 and 9, the rotatable boom portion 155a has rotated with respect to non-rotatable boom portion 155b when compared to the situation shown in FIGS. 6 and 8.

A pipe stop 170 as shown in detail in FIGS. 8 and 9 may be provided, which in the shown embodiment is connected to the non-rotatable boom portion 155b. This is e.g. beneficial when pipes are supplied towards the tubular handling apparatus, to define the position of the pipe relative to the grippers. In addition, this is beneficial when the tubular handling apparatus is in the raised position, to provide a stop for the raised pipe section.

Non-rotatable boom portion 155b is connected to a base 156 via pivot axis 156a. Hydraulic actuators 167 are provided to enable rotation of the boom 155 with respect to the base 156, until stops 145 provided on the non-rotatable boom portion 155b and stops 146 provided on the base 156 touch each other. In FIGS. 7 and 9, the boom 155 has rotated with respect to the base 156 when compared to the situation shown in FIGS. 6 and 8.

According to the present invention, base 156 is movable in a vertical translational movement with respect to the vertical beam 111 of the tower 110. Hereto, vertical beam 111 is provided with rails 160 along which the base 156, in this example provided with bogies 161 may move. To enable the vertical translation, the base 156 is provided with a pulley 165 about which hoist cables 166 are guided. The hoist cables are operated by a winch (not shown), which allows movement of the hoist cables over pulleys 165 and 168. In FIG. 7, the base 156 has been elevated with respect to the position of the base 156 shown in FIG. 6.

FIGS. 10a-10e show very schematically in perspective view an alternative example of a tubular handling system 200 according to the invention. The tubular handling system 200 comprises a tower 201 with a tubular lift device (not shown) for lowering and/or raising a tubular 202 in an essentially vertical orientation.

The tower 201 is supported on a not shown support for supporting the tubular-laying tower, on which support also a tubulars supply system, also not shown, is provided. The tubulars supply system is suitable to supply tubulars to an essentially horizontal supply position in the vicinity of the tower 201. In FIG. 10a, tubular 203 has been supplied to the essentially horizontal supply position.

A tubular handling apparatus 205 is provided for transporting tubular 203 between the essentially horizontal supply position, as shown in FIG. 10a, and the (not shown) tubular lift device in the tower 201. The tubular handling apparatus 205 comprises two grippers 206 adapted for gripping the tubular 203, and a base 209. The grippers 206 are attached to a boom 208, which boom 208 is pivotable with respect to the base 209 in a boom pivot direction B around a horizontal boom pivot axis 210, in the shown embodiment by the aid of a cylinder 211. The pivot B is visible in FIGS. 10b and 10c: in FIG. 10b the boom 208 is in a horizontal position, and in FIG. 10c the boom 208, gripping the tubular 203, has pivoted about pivot axis 210 to an essentially vertical position.

The tubular handling apparatus 205 further comprises a vertical extending frame, here formed by the tower 201, wherein said base 209 is guided by said frame and movable in a vertical translational movement with respect to the frame 201. This vertical translational movement T is visible in FIGS. 10a and 10b: in FIG. 10a the base 209 is positioned at the lower end of tower 201, while in FIG. 10b the base is positioned at an upper end of tower 201.

According to a preferred embodiment of the invention, the boom 208 as shown in FIG. 10 comprises a non-rotatable boom portion 208a connected via the horizontal boom pivot axis 210 to the base 209 and a rotatable boom portion 208b comprising the grippers 206. The rotatable boom portion 208b is rotatable with respect to the non-rotatable boom portion 208a about a rotation axis 215 of the boom 208, extending substantially parallel to the tower 201 in the raised position of the boom 208.

Figure 10D:
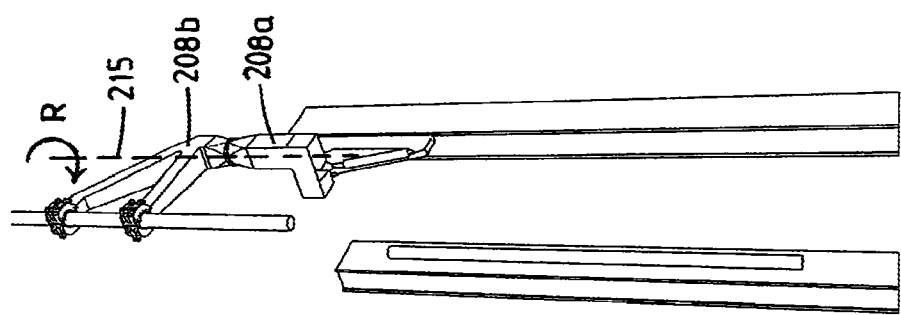
Figure 10E:
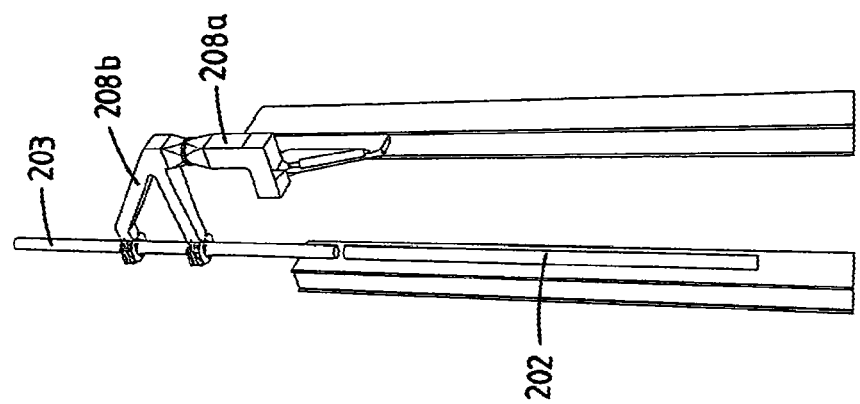

This is visible in FIGS. 10c, 10d and 10e, in which the non-rotatable boom portion 208a remains in the same raised position, while the rotatable boom portion 208b rotates in a direction R about rotation axis 215, towards a delivery position shown in FIG. 10e in which the tubular 203 is delivered to the tubular lift device (not shown) in the tower 201, here above the tubular 202 already present in the tower.

Although not shown, it is conceivable and within the scope of the present invention that the tubular handling system, e.g. a tubular handling system as schematically shown in FIG. 10, comprises two tubular handling apparatuses according to the invention. For example, the tubular handling system may comprise a single tower comprising two parallel vertical extending frames along which the bases of two tubular handling apparatuses are moveable. For example, the two tubular handling apparatuses can operate in an alternating frequency.

In FIGS. 11a-11e yet an alternative example of a tubular handling system 300 according to the invention is shown. Tubular handling system 300 comprises a tower 301 with a tubular lift device (not shown) for lowering and/or raising a tubular 303 in the tower in an essentially vertical orientation. In this embodiment, the tower 301 is slightly tilted, and hence, also the lowering/raising of tubular 303 preferably occurs at the same slight angle.

Tower 301 is provided on a support 302, on which also a tubulars supply system (not shown) is provided, supplying a tubular 304 to an essentially horizontal supply position in the vicinity of the tower.

A tubular handling apparatus 310 is provided for transporting tubular 304 between the essentially horizontal supply position shown in FIG. 11a and the tubular lift device in the tower, which position is shown in FIG. 11d.

The tubular handling apparatus 310 comprises grippers 311 adapted for gripping the tubular 304, and a base 312. The tubular handling apparatus further comprises a vertical extending frame, which in the shown embodiment is part of tower 301. Base 312 is guided by the tower 301 and movable in a vertical translational movement T with respect to the tower 301, as is visible in FIGS. 11a, 11b and 11c.

Tubular handling apparatus 310 further comprises a boom 315 to which the grippers 311 are attached. The boom 315 is pivotable with respect to the base 312 in a boom pivot direction B around a horizontal boom pivot axis 313 with the aid of cylinders 314. The boom 315 is pivotable between a lowered position for gripping tubular 304 in the essentially horizontal supply position, as shown in FIG. 11a, and a raised position for delivering a tubular to the tubular lift device in the tower, as shown in FIG. 11c.

According to the invention, the boom 315 comprises a non-rotatable boom portion 315a connected via the horizontal boom pivot axis 313 to the base 312, and a rotatable boom portion 315b comprising the grippers 311. The rotatable boom portion 315b is rotatable with respect to the non-rotatable boom portion 315a about a rotation axis 320 of the boom, extending substantially parallel to the tower 301 in the raised position of the boom 315. In FIG. 11b, the rotation axis 320 of the boom is shown extending substantially perpendicular to the tower 301, in the lowered position of the boom.

After delivery of the tubular 304 to the tubular lift device (not shown), in a position above the tubular 303 already provided in the tower 301, the tubular handling apparatus 310 is allowed to move back to the lowered position for gripping a new tubular in the essentially horizontal supply position. Such a new tubular 330 may be supplied to the supply position any time when the base 312 of the tubular handling apparatus 310 is in an elevated position. During the backward movement of the tubular handling apparatus 310, the base 312 is guided by the frame, here tower 301, in a vertical translational T' lowering movement with respect to the frame. Also, the rotatable boom portion 315b is rotated backwards in direction R' with respect to the non-rotatable boom portion 315a about the rotation axis 320 of the boom. Finally, the boom 315 in its entirety is pivoted backwards in direction B' with respect to the base 312.

The invention claimed is:

1. A marine pipelay vessel adapted to perform J-lay pipelaying operations, the vessel comprising:
   a support;
   a pipeline launch tower comprising two elongated vertical beams, equipped with a lift device for lowering and/or raising a pipeline in a firing line, wherein the firing line is positioned between the vertical beams, the vertical beams being supported at lower ends on the support by a pivot structure having a horizontal pivot axis, allowing the pipeline launch tower to be tilted, the tower supporting a line-up tool for accurate positioning a pipe section when positioned in the tower in the firing line, the tower further supporting a welding station at an elevated position, below the line-up tool, which welding station is adapted to connect a pipe section positioned in the firing line in the line-up tool and aligned by the line-up tool to a previously launched pipeline via welding;

a pipe section supply system adapted to supply a pipe section in a horizontal supply position in the vicinity of the lower end of the tower; and a handling apparatus for transporting a pipe section between the horizontal supply position and a position in the line-up tool of the tower, above the welding station, wherein the handling apparatus comprises:

rails provided on one of the elongated vertical beams, the rails extending over a vertical distance along said vertical beam;

a base which is guided by said rails and is movable along said rails in a vertical translational movement between a lowered position and a raised position of the base, which base carries a single boom; and said boom including:

a non-rotatable boom portion that is connected at one end thereof via the horizontal boom pivot axis to the base;

a rotatable boom portion which is connected to an opposed end of the non-rotatable boom portion and which is rotatable with respect to the non-rotatable boom portion about a boom rotation axis that is perpendicular to the horizontal boom pivot axis, wherein the rotatable boom portion is provided with multiple pipe section grippers adapted for gripping a pipe section at axially spaced locations thereof such that the pipe section that is gripped by said pipe section grippers is parallel to and spaced from the boom rotation axis, wherein the non-rotatable boom portion is pivotable with respect to the base between a lowered horizontal position and an upwardly raised position, wherein, with the base in the lowered position thereof and with the non-rotatable boom portion in said lowered horizontal position thereof, the pipe section grippers are engageable with a pipe section in said horizontal supply position, wherein, with said pipe section gripped by said pipe section grippers and with said non-rotatable boom portion remaining in said lowered horizontal position, the base is movable to said raised position thereof, wherein, with said base in said raised position thereof, the non-rotatable boom portion is pivotable to said upwardly raised position, wherein the boom rotation axis as well as the pipe section that is gripped by said pipe section grippers are parallel to said vertical beam provided with said rails, and wherein, with said base in raised position and said non-rotatable boom portion in said upwardly raised position, the rotatable boom portion is rotatable about said boom rotation axis so that the pipe section that is gripped by said pipe section grippers is in the firing line and positionable in the line-up tool.

2. The marine pipelay vessel according to claim 1, wherein the non-rotatable boom portion is pivotable with respect to the base by one or more hydraulically actuated cylinders between the base and the non-rotatable boom portion.

3. The marine pipelay vessel according to claim 1, further comprising an accessory supply system, provided on the support, which is adapted to bring an accessory to a location aligned with the firing line, and wherein the tower further comprises an accessory lifting device for lowering and/or raising an accessory in the firing line.

4. The marine pipelay vessel according to claim 3, wherein the pipe section supply system and the accessories supply system are situated on the same side of the tower.

5. A pipelaying method for handling pipe sections between an essentially horizontal supply position and a pipeline launch tower for lowering and/or raising a pipe section in an essentially vertical orientation, wherein use is made of a marine pipelay vessel according to claim 1, comprising the steps of:

bringing the base in the lowered position thereof and the non-rotatable boom portion in said lowered horizontal position thereof;

engaging the pipe section grippers with a pipe section in said horizontal supply position, moving the base to said raised position thereof, while the pipe section remains gripped by said pipe section grippers and while said non-rotatable boom portion remains in said lowered horizontal position;

with said base in said raised position thereof, pivoting the non-rotatable boom portion to said upwardly raised position, such that the boom rotation axis as well as the pipe section that is gripped by said pipe section grippers are parallel to said vertical beam provided with said rails; and with said base in raised position and said non-rotatable boom portion in said upwardly raised position, rotating the rotatable boom portion about said boom rotation axis so that the pipe section that is gripped by said pipe section grippers is in the firing line and positionable in the line-up tool.

6. The marine pipelay vessel according to claim 3, wherein the tower further comprises an accessory lifting device for lowering and/or raising an accessory in the firing line.

7. The marine pipelay vessel according to claim 1, further comprising a pipe stop that is connected to said non-rotatable boom portion and that is adapted to engage on an axial end face of a pipe section to be gripped by said pipe section grippers in order to define the position of the pipe section relative to the pipe section grippers.

8. The marine pipelay vessel according to claim 1, wherein said boom is provided with a gear and pinion assembly as well as one or more motors which are adapted to rotate the rotatable boom portion about the boom rotation axis.

* * * * *